(12) United States Patent
Robinson et al.

(10) Patent No.: US 8,570,423 B2
(45) Date of Patent: Oct. 29, 2013

(54) SYSTEMS FOR PERFORMING VISUAL COLLABORATION BETWEEN REMOTELY SITUATED PARTICIPANTS

(75) Inventors: Ian N. Robinson, Pebble Beach, CA (US); Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 12/769,800

(22) Filed: Apr. 29, 2010

(65) Prior Publication Data

US 2010/0238263 A1 Sep. 23, 2010

Related U.S. Application Data

(63) Continuation-in-part of application No. 12/694,743, filed on Jan. 27, 2010, which is a continuation-in-part of application No. 12/432,550, filed on Apr. 29, 2009, which is a continuation-in-part of application No. 12/321,996, filed on Jan. 28, 2009, now Pat. No. 8,355,038.

(51) Int. Cl.
- H04N 5/222 (2006.01)
- H04N 13/00 (2006.01)
- H04N 13/04 (2006.01)
- H04N 7/14 (2006.01)

(52) U.S. Cl.
USPC ............ 348/333.01; 348/42; 348/47; 348/52; 348/14.01

(58) Field of Classification Search
USPC .......... 348/47, 51, 52, 56, 14.01, 14.03, 14.1, 348/14.08, 14.16, 333.01, 333.02; 345/418, 345/592; 715/751, 759
See application file for complete search history.

(56) References Cited

U.S. PATENT DOCUMENTS

| | | | |
|---|---|---|---|
| 5,025,314 A * | 6/1991 | Tang et al. | 348/14.08 |
| 5,400,069 A * | 3/1995 | Braun et al. | 348/14.16 |
| 6,798,406 B1 * | 9/2004 | Jones et al. | 348/51 |
| 7,489,303 B1 * | 2/2009 | Pryor | 345/173 |
| 2007/0002132 A1 * | 1/2007 | Kim et al. | 348/57 |
| 2008/0094588 A1 * | 4/2008 | Cole et al. | 353/122 |
| 2008/0184124 A1 * | 7/2008 | Agarwal et al. | 715/733 |
| 2011/0169930 A1 * | 7/2011 | Bennett et al. | 348/59 |
| 2011/0199460 A1 * | 8/2011 | Gallagher | 348/46 |
| 2011/0199463 A1 * | 8/2011 | Gallagher et al. | 348/53 |
| 2012/0062565 A1 * | 3/2012 | Fuchs et al. | 345/419 |

* cited by examiner

Primary Examiner — Nhan T Tran

(57) ABSTRACT

Embodiments of the present invention are directed to visual-collaborative systems enabling geographically distributed groups to engage in face-to-face, interactive collaborative video conferences. In one aspect, a visual-collaborative system comprises a transparent display (402) having a first surface (410) and a second surface (412); and a camera system positioned to face the second surface. The display is configured to show images that can be viewed by looking at the first surface. The display is also configured to transmit light scattered off of objects facing the first surface. The light passes through the display and is captured by the camera.

15 Claims, 12 Drawing Sheets

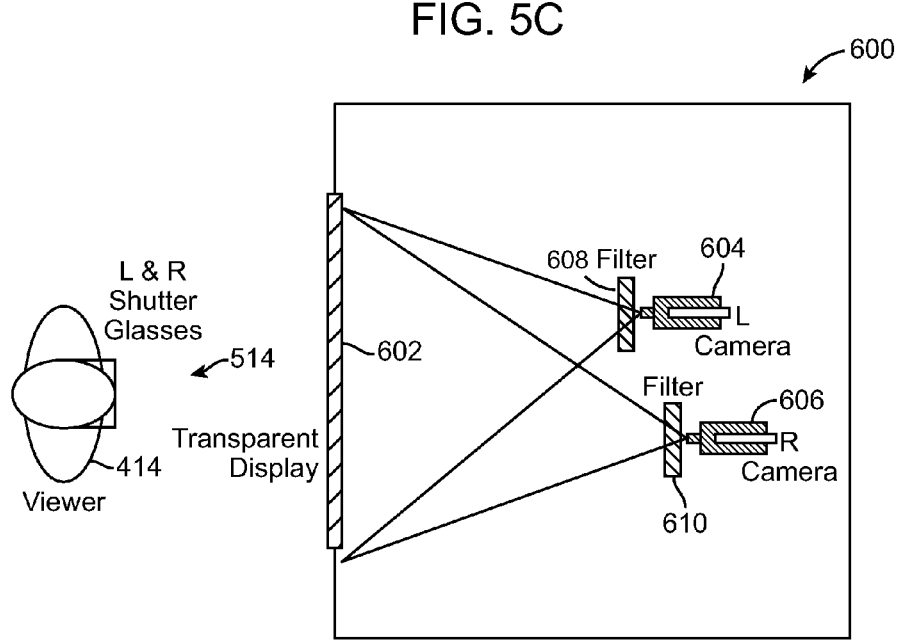

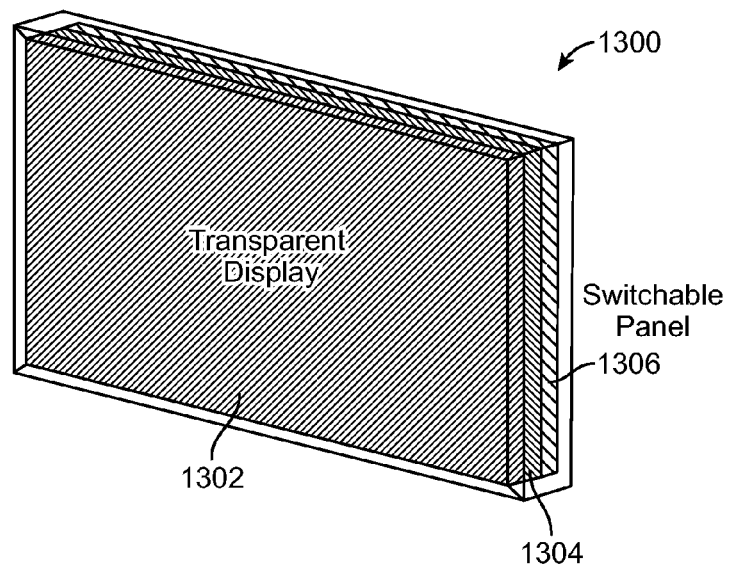
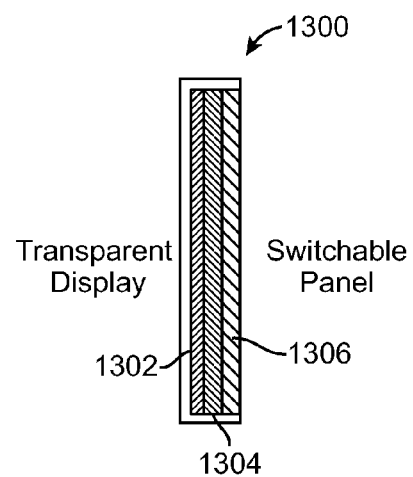
FIG. 13

SYSTEMS FOR PERFORMING VISUAL COLLABORATION BETWEEN REMOTELY SITUATED PARTICIPANTS

CROSS-REFERENCE TO RELATED APPLICATION

This application is a continuation-in-part of patent application Ser. No. 12/694,743, filed Jan. 27, 2010; which is a continuation-in-part of patent application Ser. No. 12/432,550, filed Apr. 29, 2009; which is a continuation-in-part of patent application Ser. No. 12/321,996 filed Jan. 28, 2009 now U.S. Pat. No. 8,355,038.

TECHNICAL FIELD

Embodiments of the current invention relate to remote collaboration systems and transparent displays.

BACKGROUND

Some of the most productive interactions in the workplace occur when a small group of people get together at a blackboard or a whiteboard and actively participate in presenting and discussing ideas. However it is very hard to support this style of interaction when participants are at different locations, a situation that occurs more and more frequently as organizations become more geographically distributed. To date, conventional video-conferencing systems are not well suited to this scenario. Effective collaboration relies on the ability for the parties to see each other and the shared collaboration surface, and to see where the others are looking and/or gesturing. Conventional video-conferencing systems can use multi-user screen-sharing applications to provide a shared workspace, but there is a disconnect from the images of the remote participants and the cursors moving over the shared application.

FIGS. 1-3 show schematic representations of systems configured to project images without interfering with images captured by a camera. FIG. 1 shows a communication medium with a half-silvered mirror 102, a camera 104 located above the mirror 102, and a projector 106. The mirror 102 and the projector 106 are positioned so that an image of a person or object located at a remote site is projected by the projector 106 onto the rear surface of the half-silvered mirror 102 and is visible to a participant 108. The camera 104 captures an image of the participant 101 via the participant's reflection in the mirror 102 and transmits the image to another person. The configuration of mirror 102, projector 106, and camera 104 enable the participant 108 to have a virtual face-to-face interaction with the other person. However, close interaction between the participant 108 and the other person can be disconcerting because the tilted screen makes for unnatural views of the remote user. FIG. 2 shows a communication medium with a switchable diffusing screen 202, a camera 204, and a projector 206. The screen 202 can be composed of a material that can be cycled rapidly between diffusive and transparent states. The state of the screen 202, projector 206, and camera 204 can be synchronized so that the projector 206 projects images when the screen is diffusive and the camera 204 captures images when the screen 202 in transparent. However, it is difficult to design a screen that can switch fast enough to avoid flicker, and the need to synchronize these fast switching components adds to the complexity of the system and limits the projected and captured light levels. FIG. 3 shows a top view of a communication medium with two cameras 302 and 304 on each side of a display 306. Images of a participant 308, for example, are captured by the cameras 302 and 304 and processed to create a single image of the participant 308 which appears to be captured by a single virtual camera 310 for viewing by another person at a different location. However, an image captured in this manner typically suffers from processing artifacts, especially when the captured views are at a very different angle from the intended virtual view, as would be the case with a participant located close to a large screen. This system also fails to capture hand gestures near, or drawing on, the screen surface.

It is desirable to have visual-collaborative systems that display images without interfering with and diminishing the quality of the images simultaneously captured by a camera.

BRIEF DESCRIPTION OF THE DRAWINGS

FIG. 5C shows a plot of two time slots, each time slot corresponding to synchronized operation of projectors and shutter glasses in accordance with one or more embodiments of the present invention.

FIG. 6 shows a schematic representation of a fourth visual-collaborative system configured in accordance with one or more embodiments of the present invention.

FIG. 13 shows isometric and side views of a second general system configured with a switchable panel in accordance with one or more embodiments of the present invention.

DETAILED DESCRIPTION

Embodiments of the present invention are directed to visual-collaborative systems enabling geographically distributed groups to engage in face-to-face, interactive collaborative video conferences. In the follow description the terms "local participant" and "remote participant" are relative terms used to describe participants taking part in a video conference using the visual-collaborative systems described herein. A participant interacting with another participant located at another site via a display is referred to as a local participant, and the participant displayed on the local participant's display is referred to as a remote participant. For example, consider a first participant located at a first site and a second participant located at a second site. The first participant is referred to as a local participant and the second participant is referred to a remote participant when describing embodiments of the present invention from the site or location of the first participant.

Figure 2:
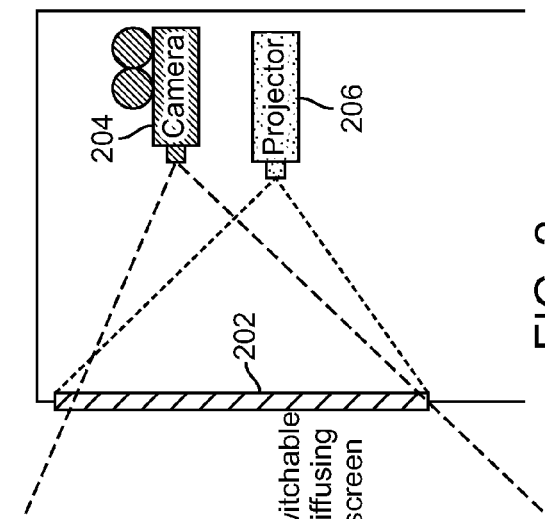
FIGS. 1-3 show schematic representations of systems configured to project images without interfering with images captured by a camera.
Figure 3:
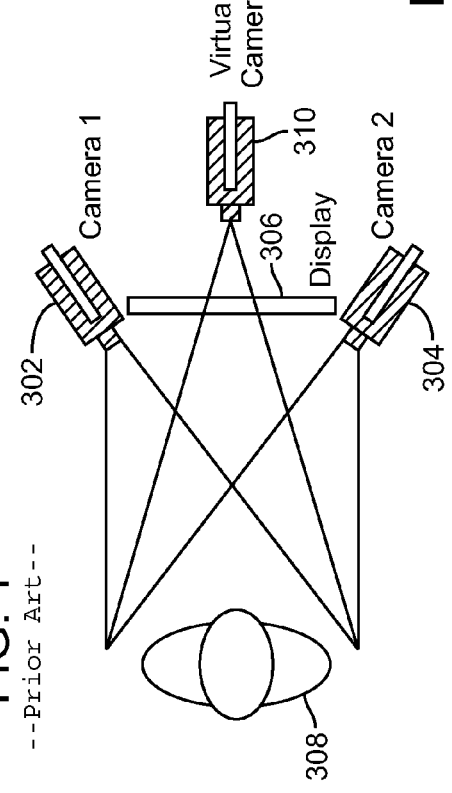
Figure 1:
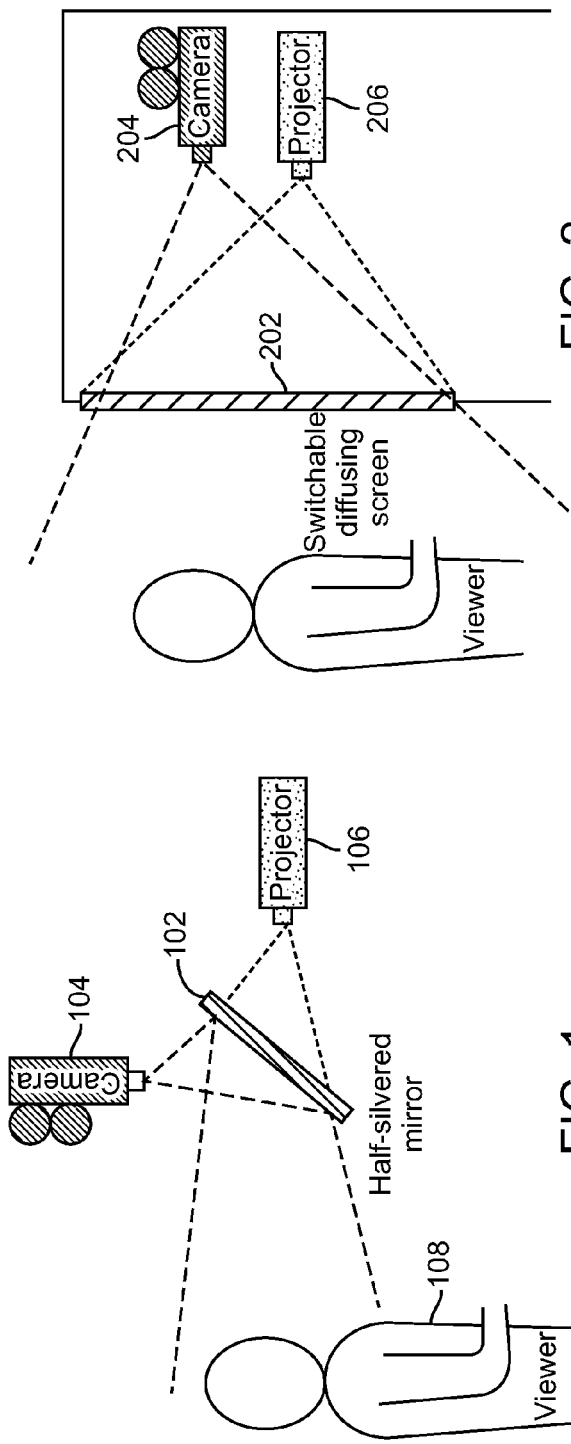
Figure 4A:
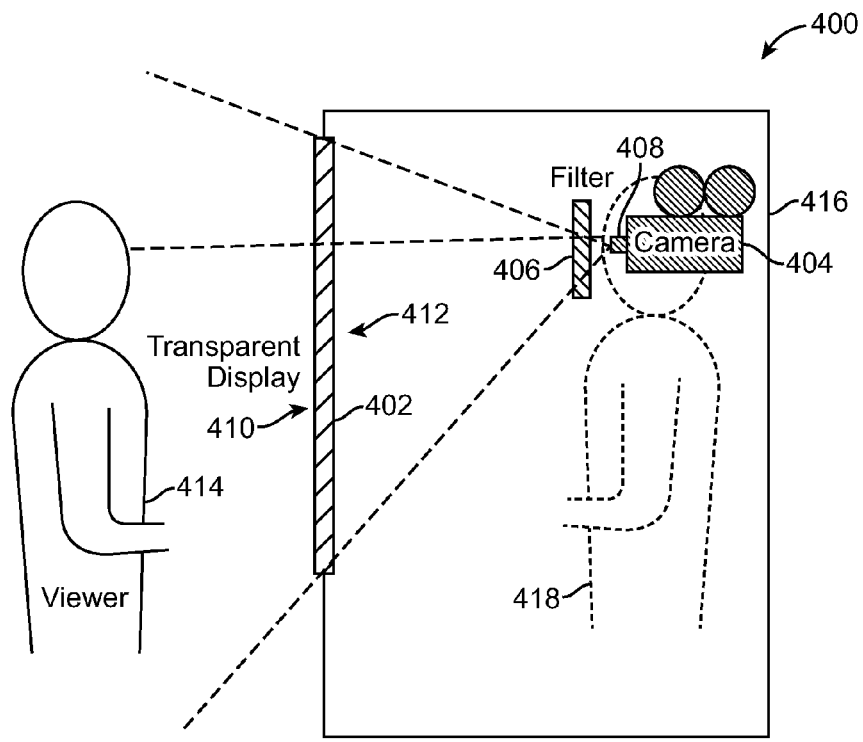
FIG. 4A shows a schematic representation of a first visual-collaborative system configured in accordance with one or more embodiments of the present invention.

FIG. 4A shows a schematic representation of a visual-collaborative system 400. The system 400 comprises a transparent display 402, a camera 404, and a filter 406 disposed between the camera lens 408 and the display 402. In the example shown in FIG. 4A, the display 402 includes a first surface 410 and a second surface 412. The display 402 is configured so that a participant 414 facing the first surface 410 sees images shown on the display 402 and can see through the display 402 to view objects located on the opposite side of the display. Alternatively, the camera 404 is positioned to face the second surface 412 so that light scattered off of objects facing the first surface 410, such as the participant 414, pass through the display 402 and is captured as images by the camera 404.

In order to prevent ambient light from reducing the contrast of the images shown and images captured by the camera, the system 400 may also include a housing or enclosure 416. The housing 416 is configured with an opening enclosing the boundaries of the display 402 and is configured so that light can only enter and exit the housing 416 through the transparent display 402.

In certain embodiments, the transparent display 402 can be an emissive organic light-emitting device ("OLED") display composed of an emissive electroluminescent layer sandwiched between two electrodes, at least one of which is transparent. A typical OLED display may be composed of an emissive electroluminescent layer, a conductive layer, a substrate, and both anode and cathode terminals. The layers can be made of organic molecules that conduct electricity and have conductivity levels ranging from insulators to conductors. The emissive layer emits light in the visible portion of the electromagnetic spectrum and transmits light that can be captured by the camera 404.

The filter 406 prevents images shown on the display 402 from being captured by the camera 404. As shown in FIG. 4, the filter 406 is positioned so that light generated by the display passes through the filter 406 before reaching the camera lens 408. The filter 406 is configured to prevent light produced by the display 402 from interfering with light transmitted through the display 402 and captured by the camera 404. In one embodiment, this is achieved by configuring the filter 406 as a wavelength filter that blocks the wavelengths ranges of light the display 402 uses to generate images. In particular, the display 402 can be configured to generate images using a first set of wavelengths ranges that when combined create the visual sensation of a much broader range of colors in showing images on the display 402, and the filter 406 can be configured to transmit a second set of wavelength ranges that are different from the first set of wavelength ranges. The second set of wavelength ranges can also be used to create the visual sensation of a much broader range of colors. In other words, the filter 406 is configured and positioned to block the wavelength ranges that are used to create images on the display 402 from entering the camera lens 408. Even though the wavelength ranges used to produce images viewed by a local participant 414 are different from the wavelengths of light used to capture images by the camera 404, the colors generated by the display 402 can be use to show full color images and the light transmitted through the filter 406 and captured by the camera 404 can also be used to record and send full color images. It is the component wavelengths of the light used to show full color images on the display 402 and capture full color images with the camera 404 that are prevented from interfering.

Figure 4B:
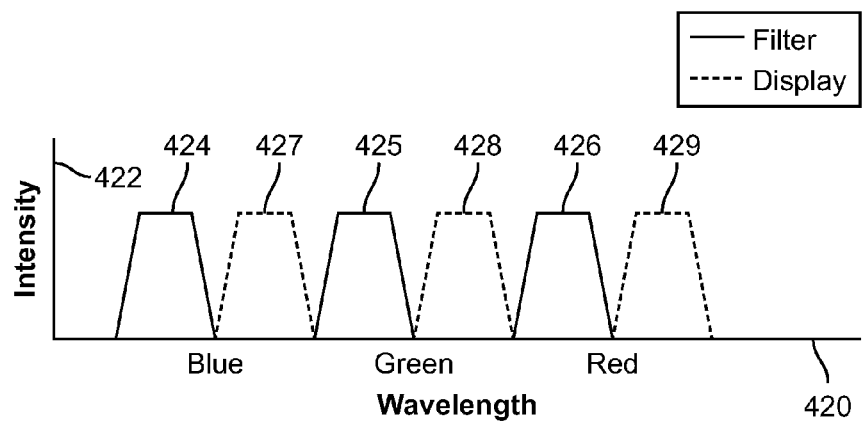
FIG. 4B shows a plot of wavelength ranges associated with a filter and display of a visual-collaborative system configured in accordance with one or more embodiments of the present invention.

FIG. 4B shows a plot of wavelength ranges over which the filter 406 transmits light and the display 402 generates light. Axis 420 represents the range of wavelengths comprising the visual spectrum, and axis 422 represents intensities of light. As shown in FIG. 4B, the red, green and blue portions of the visible spectrum are each split into two halves with curves 424-426 representing relatively shorter wavelength rangers of the red, green, and blue portions of visible spectrum transmitted through filter 406 and curves 427-429 representing relatively longer wavelength ranges of the red, green, and blue portions of visible spectrum used by the display 402 to generate images. As shown in FIG. 4B, the filter 406 does not transmit same red, green, and blue wavelength ranges used by the display 402 to generate images. In particular, the filter 406 is configured to transmit shorter wavelength ranges of the red, green, and blue portions 424-426 of the visible spectrum, and substantially block the longer wavelength ranges of the red, green, and blue portions 427-429 of the spectrum. By contrast, the display 402 is configured to generate images using the longer wavelength ranges of the red, green, and blue portions 427-429 of the visible spectrum. Both sets of red, green, and blue wavelengths can be treated as primary colors that can be combined to produce a substantially full range of colors. Thus, the combination of filters 406 and display 402 effectively block the light used to show color images on the display 402 from interfering with the color images captured by the camera 404.

The visual-collaborative system described above with reference to FIG. 4 can be used in interactive video conferencing. The camera 404 can be positioned so that the transparent display 402 acts as a window to a remote site. This can be accomplished by positioning the camera 404 at approximately eye level to local participant 414 and at approximately the same distance local participant 414 would feel comfortable standing away from the screen. For example, returning to FIG. 4A, the camera 404 can be positioned at approximately eye level to local participant 414. As a result, local participant 414 appears face-to-race with a remote participant represented by dashed-line figure 418 located at a remote site. The remote participant 418 and local participant 414 can engage in an interactive, virtual, face-to-face conversation with the display 402 serving as a window through which the remote participant 418 and the local participant 414 can clearly see each other.

Figure 5A:
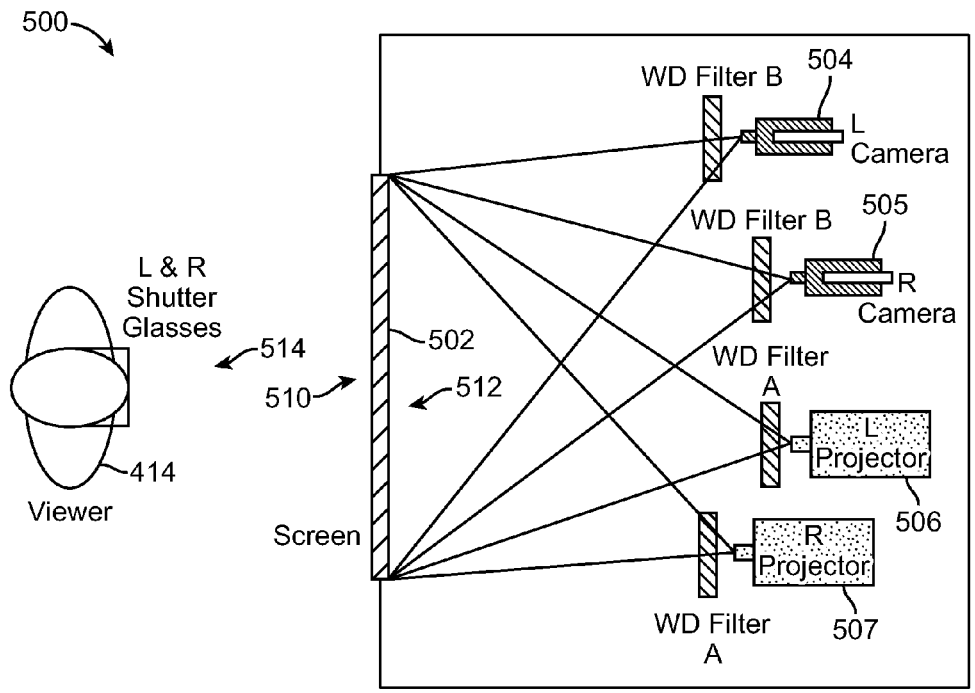
FIGS. 5A-5B show schematic representations of a second and a third visual-collaborative system configured in accordance with one or more embodiments of the present invention.
Figure 5B:
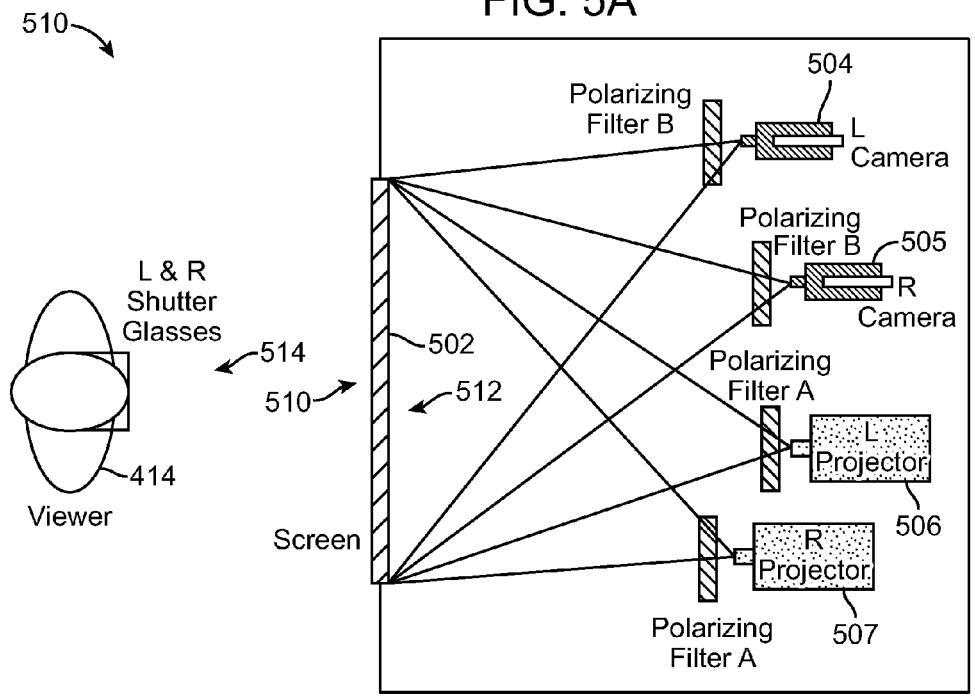

Embodiments of the present invention include displaying three-dimensional images for the local participant 414 and capturing three-dimensional images for a remote participant. FIGS. 5A-5B show a schematic representation of a visual-collaborative system 500 and a visual-collaborative system 510. As shown in the examples of FIGS. 5A-5B, the systems 500 and 510 include a transparent screen 502, a left-eye ("L") camera 504, a right-eye ("R") camera 505, an L projector 506, and an R projector 507. The L and R cameras 504 and 505 form a stereo camera system, where the L camera 504 captures left-eye images of objects in front of the screen 502 and the R camera 505 captures right-eyes images of the same objects. The L and R projectors 506 and 507 project stereo right-eye and left-eye images pairs ("stereo image pairs") that when viewed by the local participant 414 with shutter glasses 514 appear as a three-dimensional image.

In the examples of FIGS. 5A-5B, the local participant 414 views a first surface 510 of the screen 502, and the cameras 504 and 505 and projectors 506 and 507 are positioned to face a second surface 512 of the screen 502. The screen 502 is a rear projection display screen comprising a screen material that diffuses light striking the second surface 512 within a first range of angles. The projectors 506 and 507 are positioned to project stereo image pairs onto the first surface 512 within this first range of angles. The participant 414 facing the first surface 510 sees the stereo image pairs projected onto the screen 502 as a single three-dimensional image, as described in greater detail below. The screen 502 is also configured to transmit light scattered from objects facing the first surface 510. In other words, the L and R cameras 504 and 505 are positioned to face the second surface 512 so that light scattered off of objects facing the first surface 510 pass through the screen 502 and are captured as left-eye and right-eye images, respectively.

In certain embodiments, the screen 502 comprises a relatively low concentration of diffusing particles embedded within a transparent screen medium. The low concentration of diffusing particles allows cameras 504 and 505 to capture images through the screen (providing the objects are well lit), while diffusing enough of the light from the projectors 506 and 507 to form right-eye and left-eye images on the screen. In other embodiments, the display screen 502 can be a holographic film that has been configured to accept light from the projectors 506 and 507 within a first range of angles and transmit light that is visible to the local participant 414 within a different range of viewing angles. The holographic film is otherwise transparent. In both screen embodiments 500 and 510, light projected onto the second surface 512 within the first range of angles can be observed by viewing the first surface 510, but light striking the first surface 510 is transmitted through the screen 502 to the cameras 504 and 505.

However, in both systems 500 and 510, the cameras 504 and 505 also capture light that is emitted from the projectors 506 and 507 and diffused or scattered off of the second surface 512. In order to prevent light scattered off of the second surface 512 from interfering with the light transmitted through screen 502 and captured by the cameras 504 and 505, the systems 500 and 510 include filters identified as A and B. The A filters are positioned between the screen 502 and the projectors 506 and 507, and the B filters are positioned between the screen 502 and the cameras 504 and 505. The A and B filters are configured to prevent light produced by the projectors 506 and 507 and scattered by the screen 502 from interfering with light transmitted through the screen 502 and captured by the cameras 504 and 505. This can be achieved by using complementary A and B filters, where A filters pass light that is blocked by B filters, and B filters pass light that is blocked by A filters.

As shown in the example of FIG. 5A, filtering can be achieved by using wavelength division ("WD") filtering. WD A filters can be configured to transmit a first set of wavelengths ranges that when combined create the visual sensation of a broad range of colors in projecting right-eye and left-eye images on the screen 502, and WD B filters can be configured to transmit a second set of wavelength ranges that are different from the first set of wavelength ranges and can also create the visual sensation of broad range of colors. In other words, the WD B filters are configured and positioned to block the wavelength ranges that are used to project right-eye and left-eye images on the screen 502 from interfering with the light captured by cameras 504 and 505. Even though the wavelength ranges used to produce images viewed by local participant 414 are different from the wavelengths of light used to capture images by the cameras 504 and 506, the projectors 506 and 507 can still use the colors transmitted through WD A filters to project full color right-eye and left-eye images and light transmitted through the WD B filters and captured by the cameras 504 and 505 can still be used to record and send full color right-eye and left-eye images. It is the component wavelengths of the light used to project and capture the full color images that are prevented from interfering, as described above with reference to FIG. 5.

When the screen 502 is configured to maintain polarization of scattered light and the projectors 506 and 507 produce images with no polarization, polarizing A and B filters may be used as represented in FIG. 5B. The polarizing A filters have a different polarization than the polarizing B filters. In one embodiment, the A and B filters can be circularly polarizing filters, where the polarizing A filters transmit right circularly polarized light and the polarizing B filters transmit left circularly polarized light. In another embodiment, the polarizing A and B filters can be linear polarizing filters. For example, the polarizing A filters can transmit horizontally polarized light while the polarizing B filters can transmit vertically polarized light.

Although the term blocked is used to describe the filtering performed by the filters described above, in some cases a filter might not block 100% of the light of the complementary filter so that the filters are to some extent overlapping. However, when the filters are non-overlapping, the best performance is typically achieved. For example, in the embodiment where the filters are linearly polarizing filters with one set of filters (assume for purposes of example A filters) transmitting horizontally polarized light while the other set of filters (B filters) transmit vertically polarized light, the polarization of the two types of filters is ideally orthogonal. In this implementation, the filters are non-overlapping and the polarizing A filters block light not blocked by the polarizing B filters and the polarizing B filters block light not blocked by the polarizing A filters. Although orientations other than 90° orthogonal polarizations are possible, this is not desirable because as the polarization of the two sets of filters is not orthogonal system performance decreases.

As shown in the FIGS. 5A-5B, the systems 500 and 510 include shutter glasses 514 that are worn by the participant 414. In the example of FIG. 5, the shutter glasses 514 include separately operated left-eye and right-eye shutters that are electronically synchronized with the projectors 506 and 507. In particular, operation of the shutter glasses 514 is time-division multiplexed with the operation of the L and R projectors 506 and 507. FIG. 5C shows a plot of two time slots, each time slot corresponding to synchronized operation of the L and R projectors 506 and 507 and the left-eye and right-eye shutters of the shutter glasses 514. At the beginning of time slot 1, the L projector 506 is turned "on" to project the left-eye image of a stereo image pair onto the screen 502 and the R projector 507 is turn "off." The left-eye shutter of the shutter glasses 514 is opened and the right-eye shutter is closed. At the beginning of time slot 2, the R projector 507 is turned "on" to project the right-eye image of the stereo image pair onto the screen 502 and the L projector 506 is turn "off." The right-eye shutter of the shutter glasses 514 is opened and the left-eye shutter is closed. In order for the participant 414 to perceive an uninterrupted three-dimensional image without image flicker due to switching between different right-eye and left images, the operations performed in each time slot are repeated with a frequency greater than about 120 frames per second.

Embodiments of the present invention are not limited to rear projection screen implementations. In other embodiments, the screen 502 can be a front projection display screen with the L and R projectors 506 and 507 located behind the participant 414.

In other embodiments, the screen 502 can be replaced by a transparent display and the L and R projectors 506 and 507 eliminated. FIG. 6 shows a top plan view of a schematic representation of a visual-collaborative system 600. The system 600 includes a transparent display 602, L and R stereo camera 604 and 606, and filters 608 and 610 disposed between the cameras 604 and 606 and the display 602. The display 602 and filters 608 and 610 are configured and operated in the same manner as the display 402 and filter 406 described above with reference to FIG. 4. The stereo cameras 604 and 606 form a stereo camera pair that captures left-eye and right-eye images of objects located in the front of the display 602. Operation of the display 602 is electronically synchronized with the operation of the shutter glasses 514. The display 602 can be operated to switch between left-eye and right-eye images pairs captured at a remote site using a similar camera system. FIG. 6 includes a plot 612 of two time lots, each time slot corresponding to synchronized operation of the display 602 and the right-eye and left-eye shutters of the shutter glasses 514. At the beginning of time slot 1, the display 602 is operated to display a left-eye image ("L image") of a stereo image pair, and the left-eye shutter of the shutter glasses 514 is opened and the right-eye shutter is closed. At the beginning of time slot 2, the display 602 is operated to display a right-eye image ("R image") of the same stereo image pair, and the right-eye shutter of the shutter glasses 514 is opened and the left-eye shutter is closed. In order for the participant 414 to perceive an uninterrupted three-dimensional image without image flicker due to switching between different right-eye and left images, the operations performed in each time slot are repeated with a frequency greater than about 120 frames per second.

Embodiments of the present invention include using depth information in order to determine the position of one or more local participants, obtain information regarding the relative location of objects, or obtain information about the placement of a participant's hands. In certain embodiments, depth information can be collected by processing the images collected from the L and R cameras described above with reference to FIGS. 5 and 6. In other words, the L and R cameras can be used to provide three-dimensional stereo images of the participants and objects facing the transparent display 602 of FIG. 6 or the screen 502 of FIG. 5.

Figure 7A:
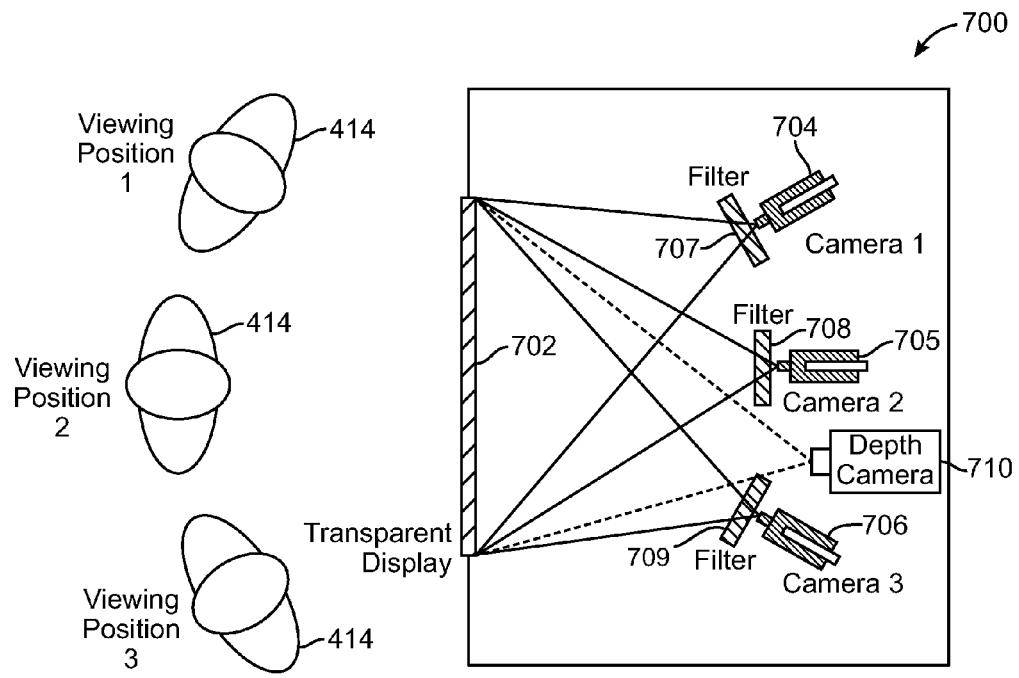
FIG. 7A shows a schematic representation of a fifth visual-collaborative system configured in accordance with one or more embodiments of the present invention.

In other embodiments, a three-dimensional, time-of-flight camera, also called a depth camera, can be included in the visual-collaborative system and the transparent display 702 can be operated as a three-dimensional transparent display. FIG. 7A shows a schematic representation of a visual-collaborative system 700. The system 700 includes a transparent display 702, three cameras 704-706, associated filters 707-709, and a depth camera 710. The filters 707-709 provide wavelength division filtering of the light captured by the cameras 707-709 and the light emitted from the display 702, as described above with reference to FIG. 4A. Each of the cameras 704-706 captures a different two-dimensional view of the participant 414 and objects placed in front of the transparent display 702. The three different perspective views may be transmitted to a remote participant with a similarly configured visual-collaborative system. The depth camera 710 is an imaging system that creates distance data based on the time-of-flight principle. The depth camera 710 illuminates a scene by generating short light pulses, such as infrared light pulses, that pass through the display 702. The depth camera 1402 also includes sensors that measure the time elapsed for reflected infrared light pulses to return to the depth camera 710 through the screen 702. Each pixel of a digital image produced by the depth camera 710 includes depth information that can be correlated with the images collected by the cameras 704-706 and processed to separate or visually enhance objects based on the object's distance from the depth camera.

Figure 7B:
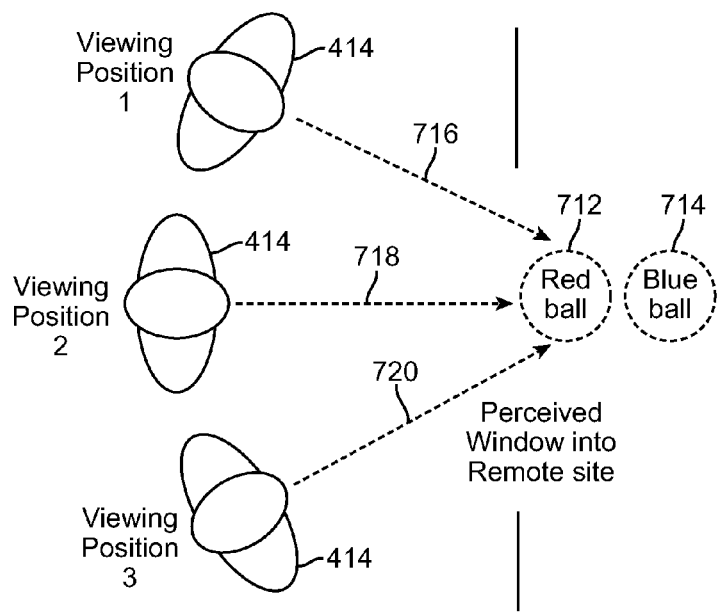
FIG. 7B shows an example of a top plan view of local participant's perceived window into a remote site in accordance with one or more embodiments of the present invention.

The depth camera 710 can be used to determine the viewing position of the local participant 414 so that images of different perspective views of objects and/or participants captured at a remote site can be viewed from different viewing positions. FIG. 7B shows an example of the local participant's 414 perceived window into a remote site. In the example of FIG. 7B, the remote participant transmits images associated with three different viewing positions identified as viewing positions 1, 2, and 3. Suppose for the sake of simplicity, the images sent to the local participant 414 are three different perspective views of a red ball 712 and a blue ball 714. The images of the three different perspective views of balls are captured at a remote site using three separate cameras analogous to the three cameras 704-706. In particular, each camera at the remote participant's location (not shown) captures a different two-dimensional image of the red ball 712 and the blue ball 714. The images of the red and blue balls are transmitted to the local participant's 414 location, and depending on which viewing position the local participant 414 is in, the system 700 determines which image of the red and blue ball is shown on the display 702. Suppose that initially the local participant 414 is located at viewing position 1. The depth information collected by the depth camera 710 is correlated with the images sent from the remote site so that the display 702 is operated to show a two-dimensional image of the red ball 712 located to the right of the blue ball 714, as indicated by directional arrow 716. When the local participant 414 moves to viewing position 2, the depth information collected by the depth camera 710 is correlated with the images received from the remote site so that the display 702 is operated to show a two-dimensional view of the red ball 712 located in front of the blue ball 714, as indicated by directional arrow 718. When the local participant 414 moves to viewing position 3, the display 702 is again operated to show a two-dimensional view of the red ball 712 located to the left of the blue ball 714, as indicated by directional arrow 720. In summary, the images of different perspective views captured at the remote site can be correlated with the depth information collected by the depth camera 710 to display different images of the remote site so that the local participant 414 perceives a three-dimensional interactive experience with the remote participant by viewing the display 702 from different viewing positions. The images captured by the cameras 704-706 enable the remote participant to also experience a similar three-dimensional viewing experience of the local participant at the remote site.

Figure 8:
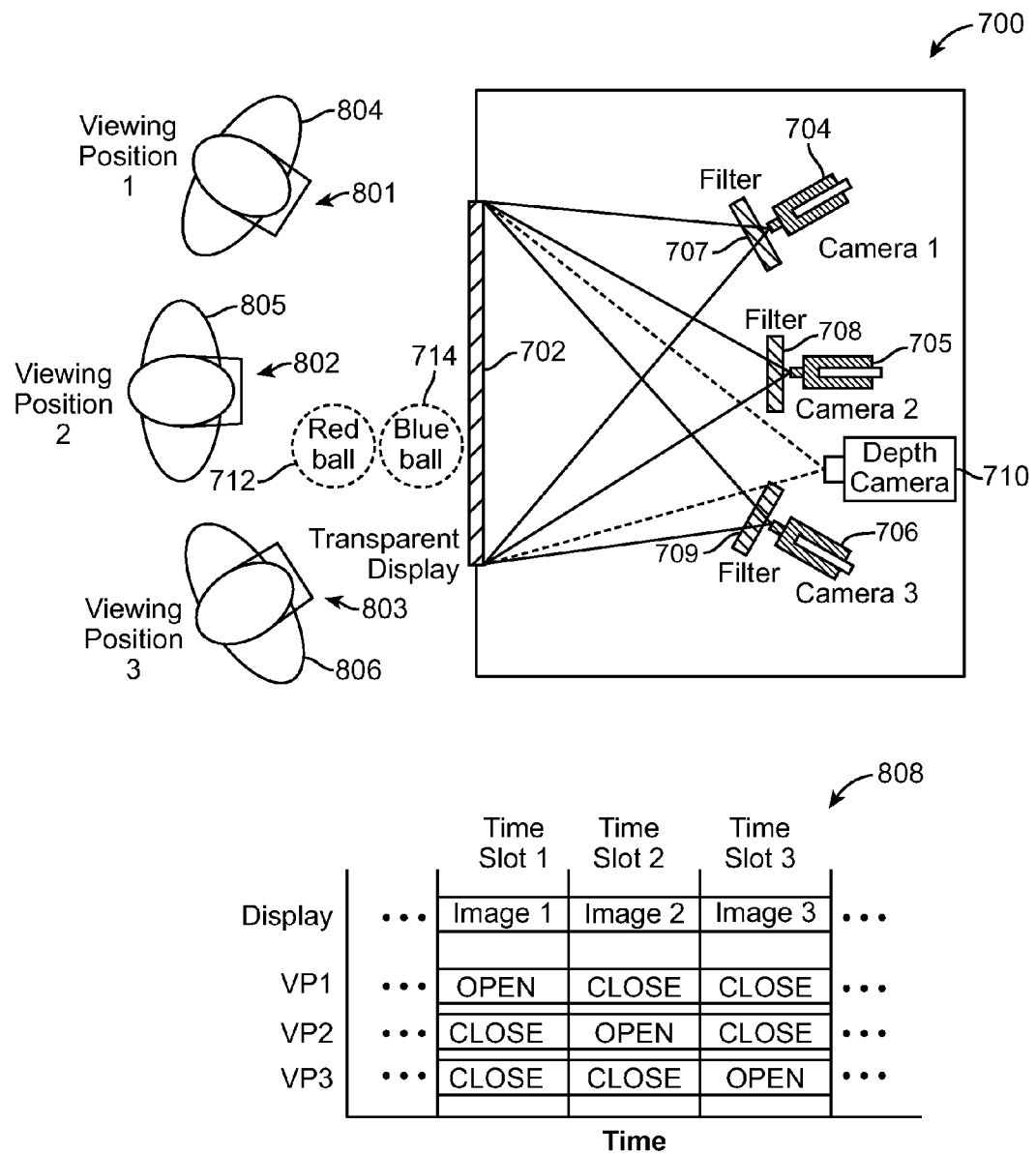
FIG. 8 shows a schematic representation of a sixth visual-collaborative system configured in accordance with one or more embodiments of the present invention.

Embodiments of the present invention can be expanded to include more than one local participant in a three-dimensional visual collaboration experience. FIG. 8 shows a schematic representation of a visual-collaborative system 700. The system 700 includes shutter glasses 801-803 worn by the three different local participants 804-806, respectively. Displaying images of the different views captured at the remote site are time-division multiplexed with the operation of the shutter glasses 801-802. FIG. 8 includes a plot 808 of three time slots, each time slot associated with displaying a particular image of a perspective view associated with a particular viewing position. For example, in time slot 1, the display 702 is operated to show an image 1 of the red and blue ball 712 and 714 for viewing position 1, and the shutter glasses 801 worn by the participant 804 are open while the shutter glasses 802 and 803 worn by the participants 805 and 806 are closed. As a result, the local participant 804 sees a two-dimensional image of the red ball 712 located to the right of the blue ball 714. In time slot 2, the display 702 is operated to show an image 2 of the same red ball 712 and blue ball 714 for viewing position 2, and the shutter glasses 802 worn by the participant 805 are open while the shutter glasses 801 and 803 worn by the participants 804 and 806 are closed. As a result, the local participant 805 sees a two-dimensional image of the red ball 712 located in front of the blue ball 714. In time slot 3, the display 702 is operated to show an image 3 of the red and blue balls for viewing position 3, and the shutter glasses 803 worn by the participant 806 are open while the shutter glasses 801 and 802 worn by the participants 804 and 805 are closed. As a result, the local participant 806 sees a two-dimensional image of the red ball 712 located to the left of the blue ball 714. The images shown in the time slots are displayed at greater than about 120 frames per second in order to avoid image flicker at the different viewing positions.

The information collected by the depth camera 710 can be used to track changes in the positions of the local participants. For example, suppose the participant 806 leaves the video conference. The information collected by the depth camera 710 indicates that viewing position 3 is no longer occupied and the images shown for viewing position 3 are no longer be displayed. In other words, as a result of viewing position 3 being empty, only images 1 and 2 of the red ball 712 and blue ball 714 are shown for viewing positions 1 and 2. The information collected from the depth camera 710 can also be used to track participants that move from one viewing position to another. For example, suppose participant 805 moves from viewing position 2 to viewing position 1. The shutter glasses 802 are then re-synchronized to view the images displayed for viewing position 1. In other words, when the participant 805 enters viewing position 1, the shutter glasses 802 are switched from being closed when images for viewing position 1 are shown on the display 702 to being open when images for viewing position 1 are shown on the display 702. As a result, participants 804 and 805 see the same perspective view presented in the same time slot.

Figure 9:
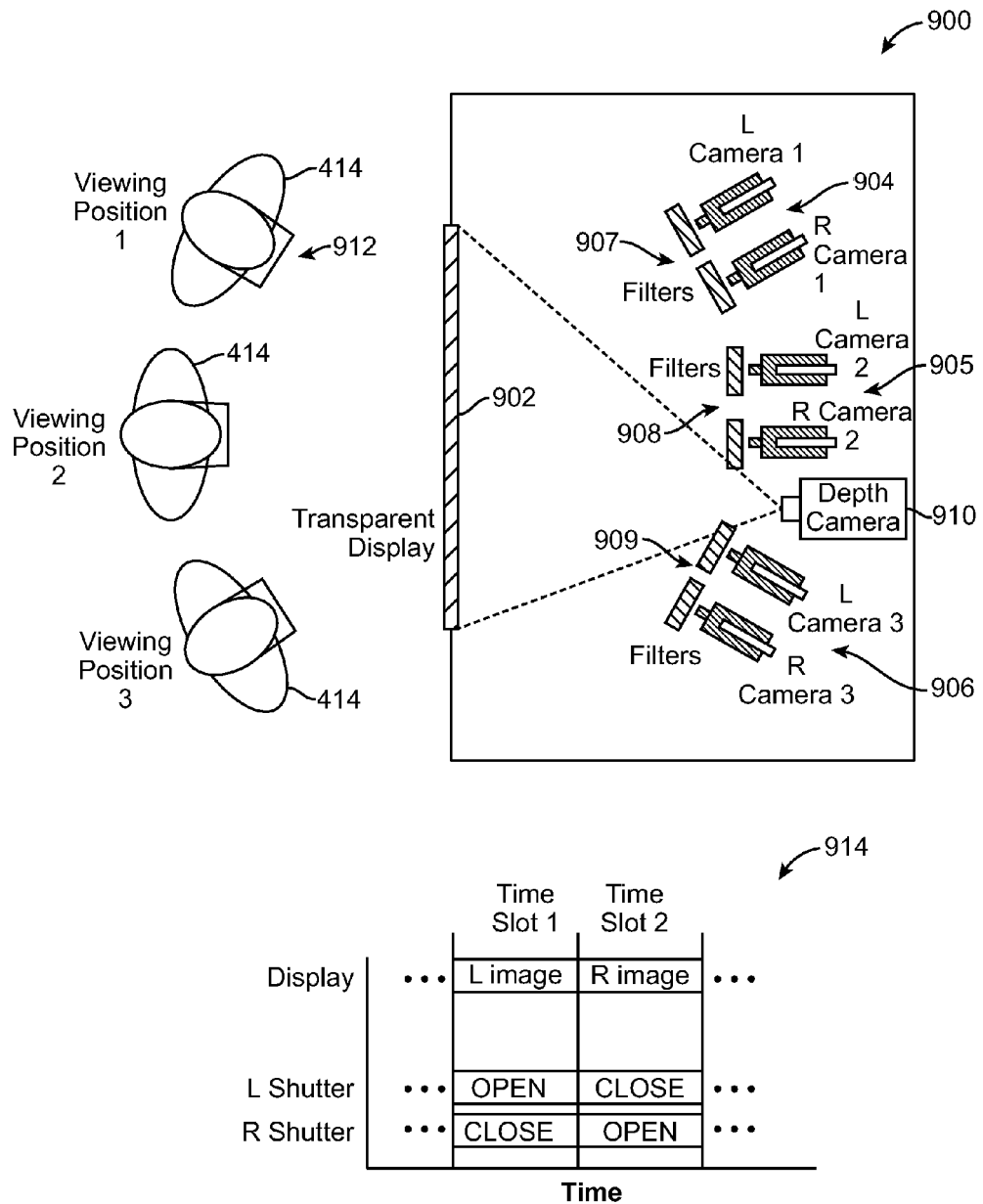
FIG. 9 shows a schematic representation of a seventh visual-collaborative system configured in accordance with one or more embodiments of the present invention.

Rather than showing two-dimensional images of different perspective views of a remote site for each viewing position, embodiments of the present invention include showing three-dimensional images of different perspective views of the remote site for each viewing position. FIG. 9 shows a schematic representation of a visual-collaborative system 900. The system 900 includes a transparent display 902, three sets of left-eye and right-eye stereo camera pairs 904-906, associated filters 907-909, and a depth camera 910. The filters 907-909 provide wavelength filtering of the light captured by the camera pairs 904-906 and the light emitted from the display 702, as described above with reference to FIG. 4. Each of the camera pairs 904-906 captures a different three-dimensional perspective view of a stereo image pair of the local participant and objects placed in front of the transparent display 902. The stereo image pairs associated with the three different perspective views are transmitted to a remote participant with a similarly configured visual-collaborative system. The system 900 includes shutter glasses that are worn by one or more participants looking at the display 902. The stereo image pairs of three different perspective views captured at the remote site are displayed for each of the viewing positions 1, 2, and 3. For each viewing position, the left-eye and right-eye images of an associated stereo image pair are displayed in separate time slots. FIG. 9 includes a plot 912 of two time slots, each time slot associated with displaying a left-eye or right-eye image for a particular viewing position j, where j equals 1, 2, or 3. The depth information collected by the depth camera 910 is correlated with the stereo image pairs sent from the remote site. In time slot 1, the display 902 is operated to show the left-eye image associated with the viewing position j, and the shutter glasses worn by the participant 414 have the right-eye shutter closed and the left-eye shutter open. In time slot 2, the display 902 is operated to show the right-eye image associated with the viewing position j and the left-eye shutter is closed and the right-eye shutter is open. The depth information collected by the depth camera can be used to determine when the participant 414 has moved to a different viewing position in order to show the corresponding left-eye and right-eye image pairs.

Figure 10B:
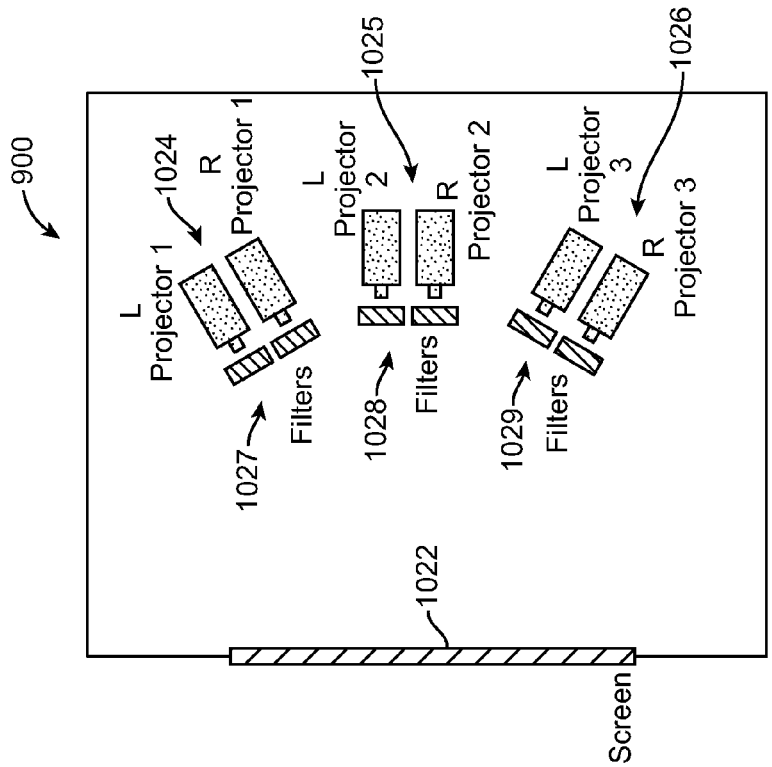
FIG. 10B shows the seventh visual-collaborative system shown in FIG. 9 with a transparent screen and stereo projectors configured in accordance with one or more embodiments of the present invention.
Figure 10A:
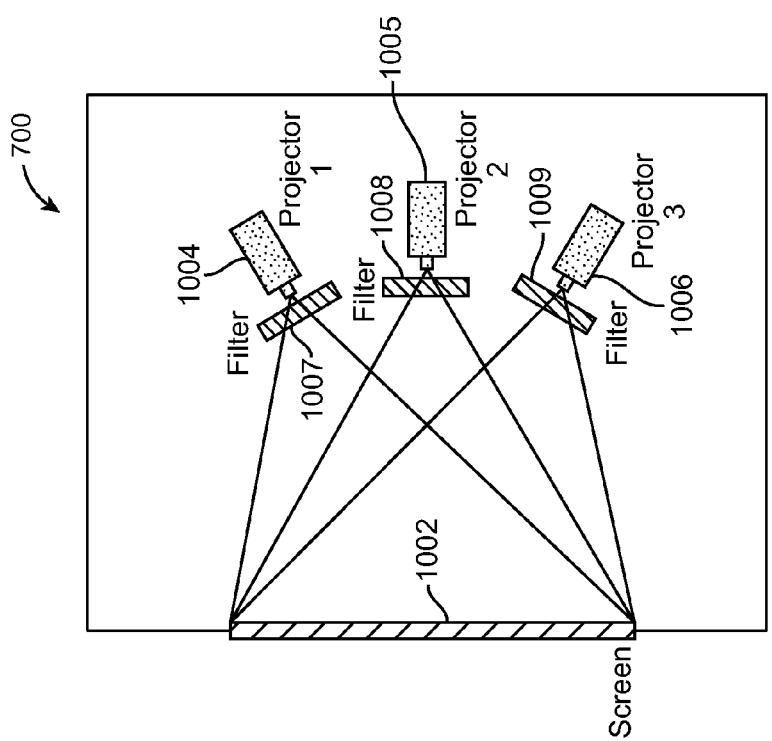
FIG. 10A shows the fifth visual-collaborative system shown in FIG. 7 with a transparent screen and projectors configured in accordance with one or more embodiments of the present invention.

System embodiments are not limited using a transparent display as described above with reference to FIGS. 7-9. In other embodiments, the transparent displays 702 and 902 can be replaced by transparent display screens and projectors with associated filters configured and operated as described above with reference to FIG. 5. FIG. 10A shows the system 700 with the transparent display 702 replaced by a screen 1002, projectors 1004-1006 and associated filters 1007-1009. For the sake of simplicity, the cameras 704-706, filters 707-709, and depth camera 710 are not shown. The filters 1007-1009 and the filters 707-709 are configured for wavelength division filtering as described above with reference to FIG. 5. Each project displays a different image of a perspective view of a remote site that can be viewed from an associated viewing position, as described above with reference to FIGS. 7 and 8. FIG. 10B shows the system 900 with the transparent display 902 replaced by a screen 1022, stereo projectors 1024-1026 and associated filters 1027-1029. For the sake of simplicity, the stereo cameras 904-906, filters 907-909, and depth camera 910 are not shown. The filters 1027-1029 and the filters 907-909 are configured for wavelength division filtering as described above with reference to FIG. 5. Each stereo projector displays a different three-dimensional image of a perspective view of a remote site that can viewed from an associated viewing position, as described above with reference to FIG. 9.

Figure 11A:
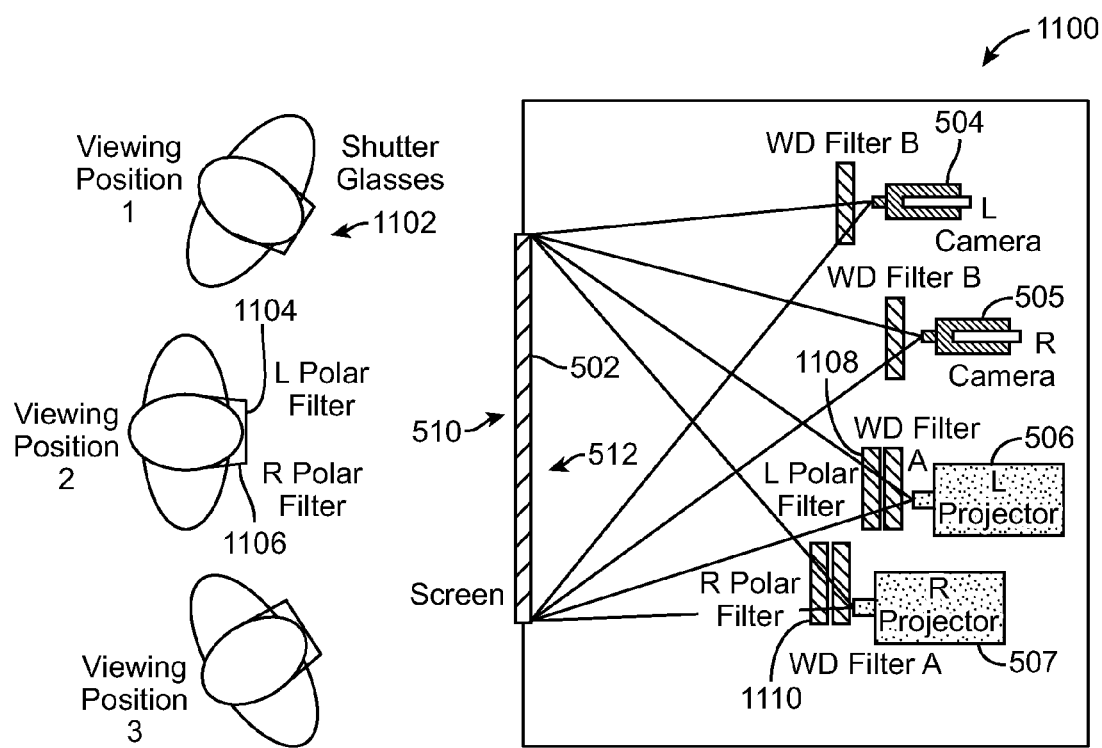
FIGS. 11A-11B show schematic representations of an eighth and a ninth visual collaborative systems configured in accordance with one or more embodiments of the present invention.

System embodiments also include projecting three-dimensional perspective views of a scene using shutter glasses with left-eye and right-eye filtering while capturing three-dimensional images for a remote participant. FIG. 11A shows a schematic representation of a visual collaborative system 1100. The system 1100 is similar to the system 500 described above with reference to FIG. 5A except the shutter glasses 514 used to view three-dimensional images from any viewing position are replaced by shutter glasses 1102 configured with different left-eye 1104 and right-eye 1106 polarization filters that correspond to left-eye 1108 and right-eye 1110 polarizing filters disposed between the L and R projectors 506 and 507 and the screen 502. Ideally, the left-eye and right-eye polarizing filters transmit orthogonal polarization states. For example, in one embodiment, the left-eye polarizing filter 1104 of the shutter glasses 1102 and the left-eye polarizing filter 1108 can both transmit horizontally polarized light, and the right-eye polarizing filter 1106 of the shutter glasses 1102 and the right-eye polarizing filter 1108 can both transmit vertically polarized light. Other orthogonal polarizing filters can be used in other embodiments. For example, the left-eye filters 1104 and 1108 can transmit 45° polarized light and the right-eye filters 1106 and 1110 can transmit −45° polarized light.

Figures 11B, 11C:
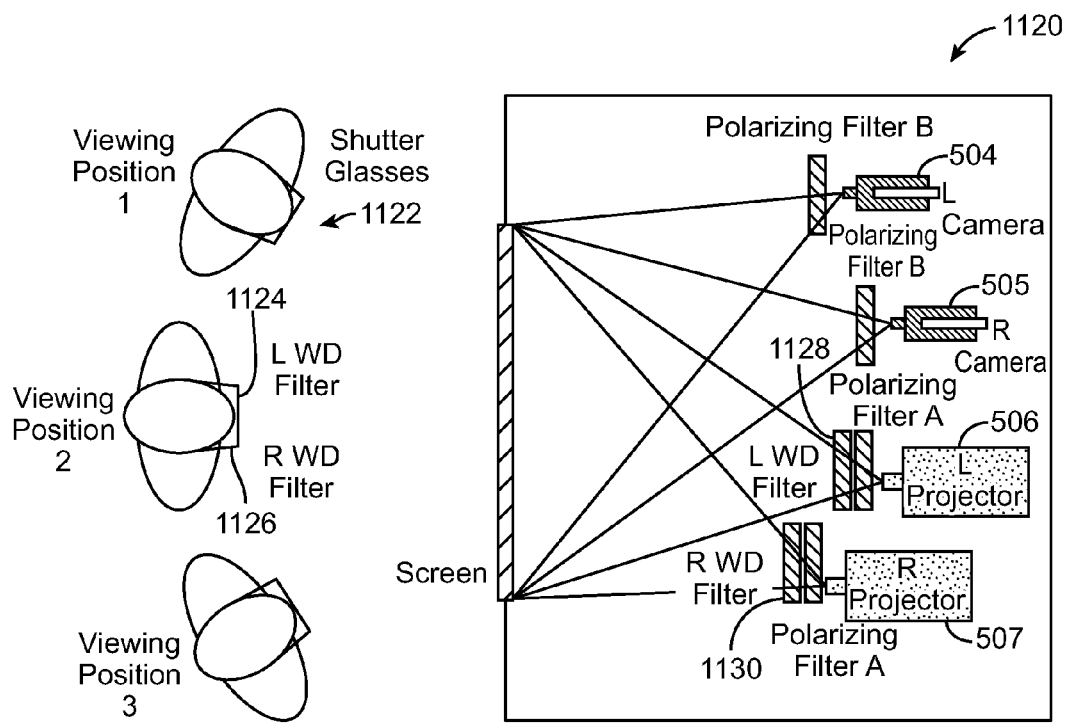
FIG. 11C shows a plot of three time slots, each time slot corresponding to synchronized operation of projectors and shutter glasses in accordance with one or more embodiments of the present invention.

FIG. 11B shows a schematic representation of a visual collaborative system 1120. The system 1120 is similar to the system 510 described above with reference to FIG. 5B except the shutter glasses 514 used to view three-dimensional images from any viewing position are replaced by shutter glasses 1122 configured with different left-eye 1104 and right-eye 1106 WD filters that correspond to left-eye 1108 and right-eye 1110 WD filters disposed between the L and R projectors 506 and 507 and the screen 502. Ideally, the left-eye and right-eye WD filters transmit light over different portions of the visible spectrum, as described above with reference to FIG. 4B. For example, in one embodiment, the left-eye WD filter 1124 and the left-eye WD filter 1128 can both transmit wavelengths in the ranges 424-426, as shown in FIG. 4B, and the right-eye WD filter 1126 and the right-eye WD filter 1130 can both transmit wavelengths in the ranges 427-429, also shown in FIG. 4B.

Operation of the shutter glasses 1102 and 1122 can be time-division multiplexed with the operation of the L and R projectors 506 and 507. FIG. 11C shows a plot of three time slots, each time slot associated with projecting a particular three-dimensional perspective view image associated with a particular viewing position. For example, in time slot 1, the L and R projectors 506 and 507 are operated to show a three-dimension perspective view image for viewing position 1, and the shutter glasses 1122 worn by a local participant located in viewing position 1 are open while the shutter glasses worn by local participants located at viewing positions 2 and 3 are closed. In time slot 2, the L and R projectors 506 and 507 are operated to show a three-dimension perspective view image for viewing position 2, and the shutter glasses 1122 worn by a local participant located in viewing position 2 are open while the shutter glasses worn by local participants located at viewing positions 1 and 3 are closed. In time slot 3, the L and R projectors 506 and 507 are operated to show a three-dimension perspective view image for viewing position 3, and the shutter glasses 1122 worn by a local participant located in viewing position 3 are open while the shutter glasses worn by local participants located at viewing positions 1 and 2 are closed.

In other embodiments, the participants located at the three different viewing positions can be viewing three different three-dimensional images that can only be viewed from a particular viewing position. In still other embodiments, the visual collaborative system 1100 and 1120 can each include a depth camera used to monitor the position of the local participants so that as a participant moves from a first viewing position to a second viewing position the shutter glasses worn by the moving participant can be retimed to view the three-dimensional images displayed for the second viewing position, as described above with reference to FIG. 8.

Figure 12A:
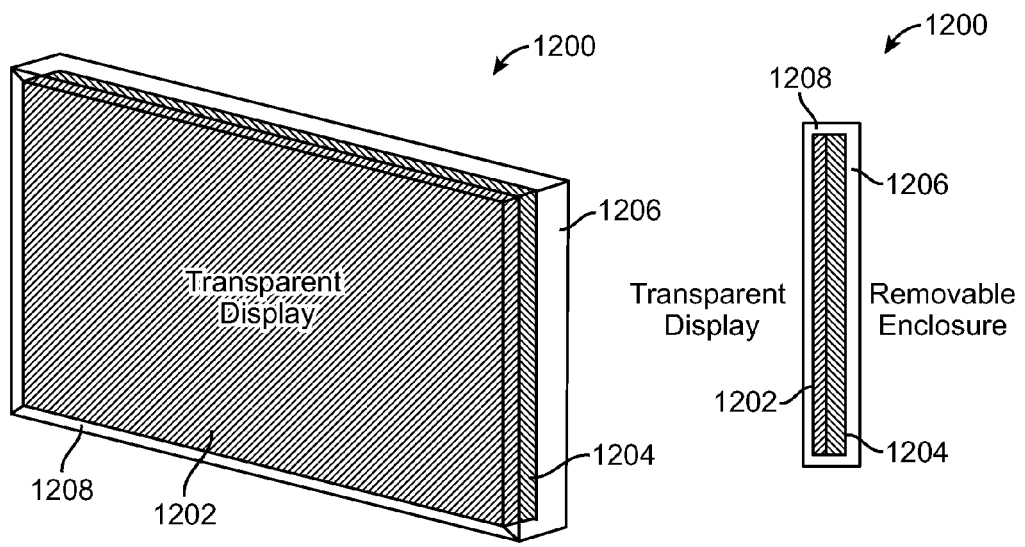
FIG. 12A shows isometric and side views of a first general system configured with a removable enclosure in accordance with one or more embodiments of the present invention.
Figure 12B:
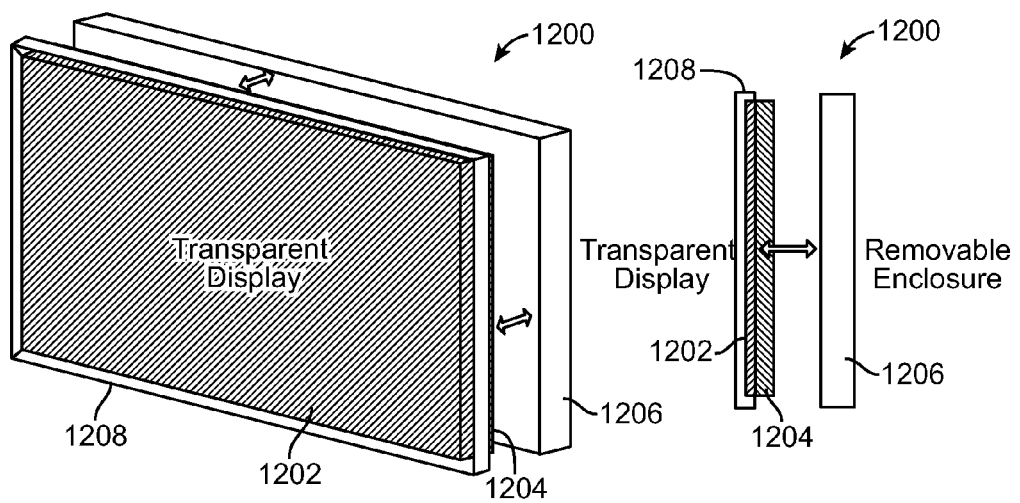
FIG. 12B shows isometric and side views of the system shown in FIG. 11A with the removable enclosure removed in accordance with one or more embodiments of the present invention.

With the transparent displays and screens described above it is possible for local participants to see through the display surface, which may create a distracting visual experience for some participants. The above described embodiments all include a housing that encloses the cameras and/or projectors in order to control black level or contrast and backlighting, thereby eliminating visual distraction. However, in certain situations participants may prefer not to include the housing. Thus, system embodiments described above, include the option of a removable enclosure allowing participants to select between different viewing experiences. FIG. 12A shows isometric and side views of a general system 1200 with a removable enclosure. The system 1200 can represent the visual-collaborative systems described above. The system 1200 includes a transparent display 1202, camera and filter components 1204 located behind the screen 1202, and a removable enclosure 1206. For example, the display 1202 and camera and filter components 1204 may represent the display and camera and filter components of the systems 400, 700, and 900 described above. In other embodiments, the display 1202 and camera and filter components 1204 may represent the screen and camera, filter, and projector components of the system 500. FIG. 12B shows isometric and side views of the system 1200 with the removable enclosure separated from a frame 1208. Removing the enclosure 1206 enables participants to see objects located behind the display 1202. In other embodiments, the system 1200 may not include the camera and projector components 1204 and can simply be used as a display, such as a computer monitor or television, with a removable enclosure.

Rather than controlling the opacity of the system 1200 by physically removing the enclosure 1206, in other embodiments, a general system can be configured with a switchable panel located behind the display. FIG. 13 shows isometric and a side views of a general system 1300 including a transparent display 1302, camera and filter components 1304, and a switchable panel 1306 located behind the display 1302. For example, the display 1302 and camera and filter components 1304 may represent the display and camera and filter components of the systems 400, 700, and 900 described above. In other embodiments, the display 1302 and camera and filter components 1304 may represent the screen and camera, filter and projector components of the system 500. The switchable panel 1304 can be an electronically controllable liquid crystal panel that can be switched from opaque to transparent, providing a participant viewing the display 1302 with different viewing experiences. For example, the switchable panel 1304 can be switched from opaque that prevents background light from being transmitted through the display 1302 to transparent enabling a participant to see objects shown on the display 1302 as well as objects located behind the display. In other embodiments, the system 1300 may not include the camera and projector components 1304 and can simply be used as a display, such as a computer monitor or television.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A visual-collaborative system comprising:
a transparent screen having a first surface and a second surface;
a rear projection system comprising a right projector and a left projector, the projection system being configured to project stereo image pairs onto the second surface of the transparent screen, the rear projection system including a first filter system disposed between the projectors and the screen, the first filter system being configured to pass through a set of wavelengths in a visible spectrum;
wherein the set of wavelengths corresponds to one of a shorter or longer wavelength range of each of a red, green, and blue portion of the visible spectrum;
a camera system having a left camera and a right camera, the camera system being configured to receive light passing through and light reflected from the transparent screen, the camera system including a second filter system disposed between the cameras and the screen, the second filter system being configured to block the set of wavelengths such that the light reflected from the transparent screen is substantially blocked, and the light passing through the transparent screen is substantially passed through the second filter system; and
shutter glasses having a left eye shutter and a right eye shutter, the left eye shutter being synchronized with the left projector, the right eye shutter being synchronized with the right projector, the shutter glasses functioning to provide a participant wearing the glasses to view a three dimensional image on the first surface of the transparent screen, the three dimensional image corresponding to the stereo image pairs projected by the rear projection system.

2. The system of claim 1, wherein the screen further comprises a holographic film configured to reflect light incident within a first range of angles and transmit light incident within a different range of viewing angles.

3. The system of claim 1, wherein the camera system further comprise two or more stereo camera pairs, each stereo camera pair configured to capture a different three-dimensional perspective view through the screen.

4. The system of claim 1, wherein the camera system further comprise two or more stereo projection pairs, each stereo projector pair configured to project a different three-dimensional perspective view onto the screen.

5. The system of claim 1, further comprising a removable enclosure configured to enclose the screen, the projection system, and the camera system, the removable enclosure being further configured to enable a contrast and background lighting of the screen to be changed.

6. The system of claim 1, further comprising a switchable panel disposed behind the second surface of the screen, the switchable panel electronically operable to switch from an opaque background for the screen to a transparent background for the screen.

7. The system of claim 6, wherein the switchable panel further comprises a liquid crystal panel that can be electronically switched from opaque to transparent.

8. The system of claim 1, wherein the first filter system is comprised of a right projector filter and a left projector filter, the right projector filter being disposed between the right projector and the screen, the left projector filter being disposed between the left projector and the screen, the projector filters being configured to pass through the set of wavelengths.

9. The system of claim 1, wherein the second filter system is comprised of a right camera filter and a left camera filter, the right camera filter being disposed between the right camera and the screen, the left camera filter being disposed between the left camera and the screen, the camera filters being configured to block the set of wavelengths such that the light reflected from the transparent screen is substantially blocked, and the light passing through the transparent screen is substantially passed through the camera filters.

10. A visual-collaborative system comprising:
a transparent screen having a first surface and a second surface;
a projection system configured to project images onto the screen;
a camera system facing the second surface;
a removable enclosure configured to enclose the screen, the projection system, and the camera system, the removable enclosure being further configured to enable a contrast and background lighting of the screen to be changed; and
shutter glasses to be worn by a local participant facing the first surface of the screen, wherein operation of the shutter glasses is synchronized with operation of the projectors such that images of different perspective views projected onto the screen are separately viewed from different viewing positions.

11. The system of claim 10, wherein the camera system is configured to capture substantially all of the light passing through the screen.

12. The system of claim 10, further comprising:
a first filter disposed between the second surface of the screen and the projection system; and
a second filter disposed between the second surface of the screen and the camera system;
wherein the first filter is configured to pass through a set of wavelengths, and the second filter is configured to block the set of wavelengths, such that light passing through the screen is substantially passed through the second and captured by the camera system, and light from the projector reflected from the second surface is substantially blocked by the second filter;
wherein the set of wavelengths corresponds to one of a shorter or longer wavelength range of each of a red, green, and blue portion of the visible spectrum.

13. The system of claim 12, wherein the screen further comprises a holographic film configured to reflect light incident within a first range of angles and transmit light incident within a different range of viewing angles.

14. The system of claim 12, further comprising a switchable panel disposed behind the second surface of the screen, the switchable panel electronically operable to switch from an opaque background for the screen to a transparent background for the screen.

15. The system of claim 12, wherein the switchable panel further comprises a liquid crystal panel that can be electronically switched from opaque to transparent.

* * * * *

UNITED STATES PATENT AND TRADEMARK OFFICE
CERTIFICATE OF CORRECTION

Page 1 of 1

PATENT NO.        : 8,570,423 B2
APPLICATION NO.   : 12/769800
DATED             : October 29, 2013
INVENTOR(S)       : Ian N. Robinson et al.

It is certified that error appears in the above-identified patent and that said Letters Patent is hereby corrected as shown below:

In the Claims:

In column 13, line 62, in Claim 7, delete "claim 6," and insert -- claim 5, --, therefor.

Signed and Sealed this
Eighteenth Day of February, 2014

Michelle K. Lee
*Deputy Director of the United States Patent and Trademark Office*